(12) United States Patent
Ramos et al.

(10) Patent No.: US 9,338,175 B1
(45) Date of Patent: May 10, 2016

(54) METHODS AND SYSTEMS FOR PROVIDING COMPREHENSIVE CYBER-SECURITY PROTECTION USING AN OPEN APPLICATION PROGRAMMING INTERFACE BASED PLATFORM SOLUTION

(71) Applicant: AT&T Intellectual Property I, L.P., Atlanta, GA (US)

(72) Inventors: Anthony Ramos, Gainesville, VA (US); Daniel Solero, Morresville, IN (US); William A. O'Hern, Spring Lake, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/551,346

(22) Filed: Nov. 24, 2014

(51) Int. Cl.
*H04L 29/06* (2006.01)
*G06Q 10/06* (2012.01)
*G06F 21/57* (2013.01)

(52) U.S. Cl.
CPC .................................. *H04L 63/1408* (2013.01)

(58) Field of Classification Search
CPC .............. G06F 21/577; G06Q 10/0635; H04L 63/1433
USPC ........... 726/22, 26, 27, 28; 713/153, 176, 188
See application file for complete search history.

(56) References Cited

U.S. PATENT DOCUMENTS 7,213,266 B1 * 5/2007 Maher .................... G06Q 10/10
705/2
7,603,548 B2   10/2009 Patrick et al.
(Continued)

OTHER PUBLICATIONS

"Certified Software"—Zhong Shao, Yale Univ., Jun. 2011 http://flint.cs.yale.edu/flint/publications/certsoft.pdf.*
Lenane, Brian P., "Cyber Security for Federal Smart Grids,".
(Continued)

*Primary Examiner* — Randy Scott
(74) *Attorney, Agent, or Firm* — Scott P. Zimmerman, PLLC

(57) ABSTRACT

Methods of providing cyber-security services to a plurality of customers include providing a platform that includes a software program that is configured to run on a processor to implement a user interface that is accessible by customers. The software program includes an application programming interface that is configured to allow a platform operator and third party providers to offer computer implemented cyber-security services to the customers through the user interface. Integration standards for the application programming interface are provided to the third party providers, the integration standards specifying how the computer implemented cyber-security services can be integrated into the platform. First and second computer implemented cyber-security service that are provided by respective first and second of the third party providers are accepted into the platform, each of which is self-certified by the third party provider as being operable through the platform. The first and second computer implemented cyber-security services are then delivered to respective first and second of the customers through the platform.

15 Claims, 9 Drawing Sheets

(56) References Cited

U.S. PATENT DOCUMENTS

| | | | |
|---|---|---|---|
| 7,707,626 | B2 | 4/2010 | Albisu et al. |
| 8,621,202 | B2 | 12/2013 | Mukherjee |
| 8,621,637 | B2 | 12/2013 | Al-Harbi et al. |
| 8,625,800 | B2 | 1/2014 | Jooste et al. |
| 8,726,393 | B2 | 5/2014 | Macy et al. |
| 2010/0218182 | A1* | 8/2010 | Hahn ............... G06F 21/10 717/178 |
| 2012/0011077 | A1 | 1/2012 | Bhagat |
| 2013/0086376 | A1 | 4/2013 | Haynes |
| 2014/0157405 | A1 | 6/2014 | Joll et al. |

OTHER PUBLICATIONS

Gopalakrishnan, Kasthurirangan, et al. "Cyber Security for Airports," International Journal of Traffic and Transport Enigneering 3.4 (2013) pp. 365-376.

Yildirim, N., R. Das, and A. Varol, A Research on Software Security Vulnerabilities of New Generation Smart Mobile Phones, $2^{nd}$ International Symposium on Digital Forensics and Security (ISDFS'14) May 12-13, 2014, Houston TX.

U.S. Appl. No. 13/949,695, filed Jul. 24, 2013.

\* cited by examiner

METHODS AND SYSTEMS FOR PROVIDING COMPREHENSIVE CYBER-SECURITY PROTECTION USING AN OPEN APPLICATION PROGRAMMING INTERFACE BASED PLATFORM SOLUTION

FIELD

The present disclosure relates generally to cyber-security and, more particularly, to cyber-security systems and methods that may provide comprehensive, integrated cyber-security threat protection.

BACKGROUND

Cyber-security refers to measures that are taken to protect computer networks and computing devices such as computers, servers and smartphones against cyber-security threats such as efforts to gain unauthorized access to computer equipment or stored data or efforts to damage or destroy the same. The types of cyber-security threats and the frequency of cyber-security attacks is increasing, as is the sophistication of the attacks. The types of cyber-security threats now include, for example, attacks that are designed to gain unauthorized access to information stored on the computing devices, denial of service attacks which use various means to render a computing device unusable, and attacks which use the computing device for nefarious purposes, such as sending out spam e-mail, viruses, worms or the like. The purposes of these attacks may include, for example, disrupting the operations of a target organization; stealing intellectual property, financial information or credit card data; identity theft; committing corporate espionage; and/or outright sabotage of the organization's computing system and/or network. Today's cyber-security threats often involve advanced cyber-crime syndicates, sophisticated "hacktivist" groups, foreign governments and other sponsored entities that utilize complex malware, botnets and other techniques to improperly access or use another entities' computing devices, steal information therefrom, and/or to destroy such devices and/or the data stored thereon. These cyber-security threats may pose a significant challenge to cyber-security programs used by many businesses and other organizations.

As the modern computing environment evolves to encompass mobility devices such as smartphones and tablets that are wirelessly connected to corporate networks, remote access of network servers by employees working at home or other remote locations, cloud storage and application services, transitive partner connections and the like, the traditional perimeter that businesses and other organizations have conventionally used for cyber-security may no longer be adequate. As such, critical infrastructure and data may be exposed to theft or destruction because the existing cyber-security measures are incomplete, outdated or delivered by segregated managed services without cohesive integration such that gaps exist that may be exploited by malicious entities. Accordingly, improved cyber-security approaches are needed.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide methods of providing cyber-security services to a plurality of customers in which a platform that includes a software program that is configured to run on a processor to implement a user interface that is accessible by customers is provided. The software program includes an application programming interface that is configured to allow a platform operator and third party providers to offer computer implemented cyber-security services to the customers through the user interface. Integration standards for the application programming interface are provided to the third party providers, the integration standards specifying how the computer implemented cyber-security services can be integrated into the platform. A first computer implemented cyber-security service that is provided by a first of the third party providers is accepted into the platform, where the first computer implemented cyber-security service is self-certified by the first of the third party providers as being operable through the platform. A second computer implemented cyber-security service that is provided by a second of the third party providers is also accepted into the platform, where the second computer implemented cyber-security service is self-certified by the second of the third party providers as being operable through the platform. The first computer implemented cyber-security service is then delivered to a first of the customers through the platform and the second computer implemented cyber-security service is delivered to a second of the customers through the platform.

In some embodiments, the software program is stored in a memory and the processor comprises a server. In such embodiment, the application programming interface may be configured to allow third party software programs that are controlled by the third party providers to interact with the software program to offer computer implemented cyber-security services of the third party providers to the plurality of customers through the user interface.

In some embodiments, a third computer implemented cyber-security service that is provided by a third of the third party providers may be accepted into the platform, where the third computer implemented cyber-security service is self-certified by the third of the third party providers as being operable through the platform. The third computer implemented cyber-security service may include a module that is self-certified by a fourth of the third party providers as being operable through the platform.

In some embodiments, at least one non-cyber-security computer implemented service that is provided by a third of the third party providers may also be accepted into the platform, where the at least one non-cyber-security computer implemented service is self-certified as being operable through the platform.

In some embodiments, an order for the first computer implemented cyber-security service may be received from the first of the customers at the platform and this order may be transmitted to the first of the third party providers. Data generated by the first computer implemented cyber-security service may then be received at the platform and transmitted to the first of the customers.

In some embodiments, commissioning information for the first computer implemented cyber-security service may be received from the first of the customers at the platform, and this commissioning information may be transmitted to the first of the third party providers prior to delivering the first computer implemented cyber-security service to the first of the customers.

In some embodiments, the computer implemented user interface may include a web-based marketplace that identifies the cyber-security services that are available through the platform and at least one web-based customer interface that is configured to allow one of the plurality of users to administer one of the cyber-security services through the platform.

In some embodiments, a third computer implemented cyber-security service that is provided by the platform operator may be delivered to the first of the customers through the platform.

In some embodiments, information regarding identified threats that is received from the platform operator and at least one of the third party providers may be collected at the platform. In some embodiments, this information regarding identified threats is stored at the platform in a pre-determined format that is specified by the integration standards for the application programming interface.

In some embodiments, log data may be electronically received at the platform from a first of the plurality of customers and this log data may then be forwarded to at least the platform operator and one of the third party providers.

In some embodiments, a non-cyber-security related service may be delivered to a first of the plurality of customers through the platform.

In some embodiments, the third party providers may be charged for access to the platform.

In some embodiments, one of the third party providers may be a cyber-security hardware vendor. In such embodiments, an order may be received at the platform from one of the customers for an item of hardware offered by the cyber-security hardware vendor through the platform. Additionally, pre-commissioning information for the item of hardware may be received at the platform from the customer.

Pursuant to further embodiments, computer-implemented platform for offering and providing a plurality of computer-implemented services to a plurality of customers are provided that include a processor and a memory that includes computer program code. The computer program code, when executed on the processor, is configured to implement a user interface that is accessible by the plurality of customers over a network. The user interface includes a web-based marketplace that identifies the computer-implemented services that are available through the platform and that further implements, for each customer that receives one or more of the computer-implemented services through the platform, a separate web-based customer interface that is configured to allow the customer to administer the computer-implemented services that they receive through the platform. The computer program code, when executed on the processor, is further configured to implement an application programming interface that allows a platform operator and plurality of third party providers to each offer a subset of the computer-implemented services to the customers through the user interface and that allows the ones of the customers that order one or more of the computer-implemented services to administer the ordered computer-implemented services through the user interface. The computer-implemented services are certified by the third party providers as being operable through the user interface.

Pursuant to still further embodiments methods for a platform operator to provide cyber-security services and products to a plurality of customers are provided in which a platform is provided that includes a web-based marketplace that is accessible by each of the plurality of customers, the marketplace identifying the cyber-security services and products that are available for purchase. The platform further includes a web-based interface for each of the plurality of customers who purchases at least one cyber-security services or products. Integration standards are provided for an open application programming interface for the platform to a plurality of unrelated third party providers. A first cyber-security service that is offered by the platform operator is delivered to a first of the customers and a second cyber-security service that is offered by one of the unrelated third party providers is also delivered to a first of the customers.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

Other features of exemplary embodiments will be more readily understood from the following detailed description of specific embodiments thereof when read in conjunction with the accompanying drawings, in which.

DETAILED DESCRIPTION

Figure 1:
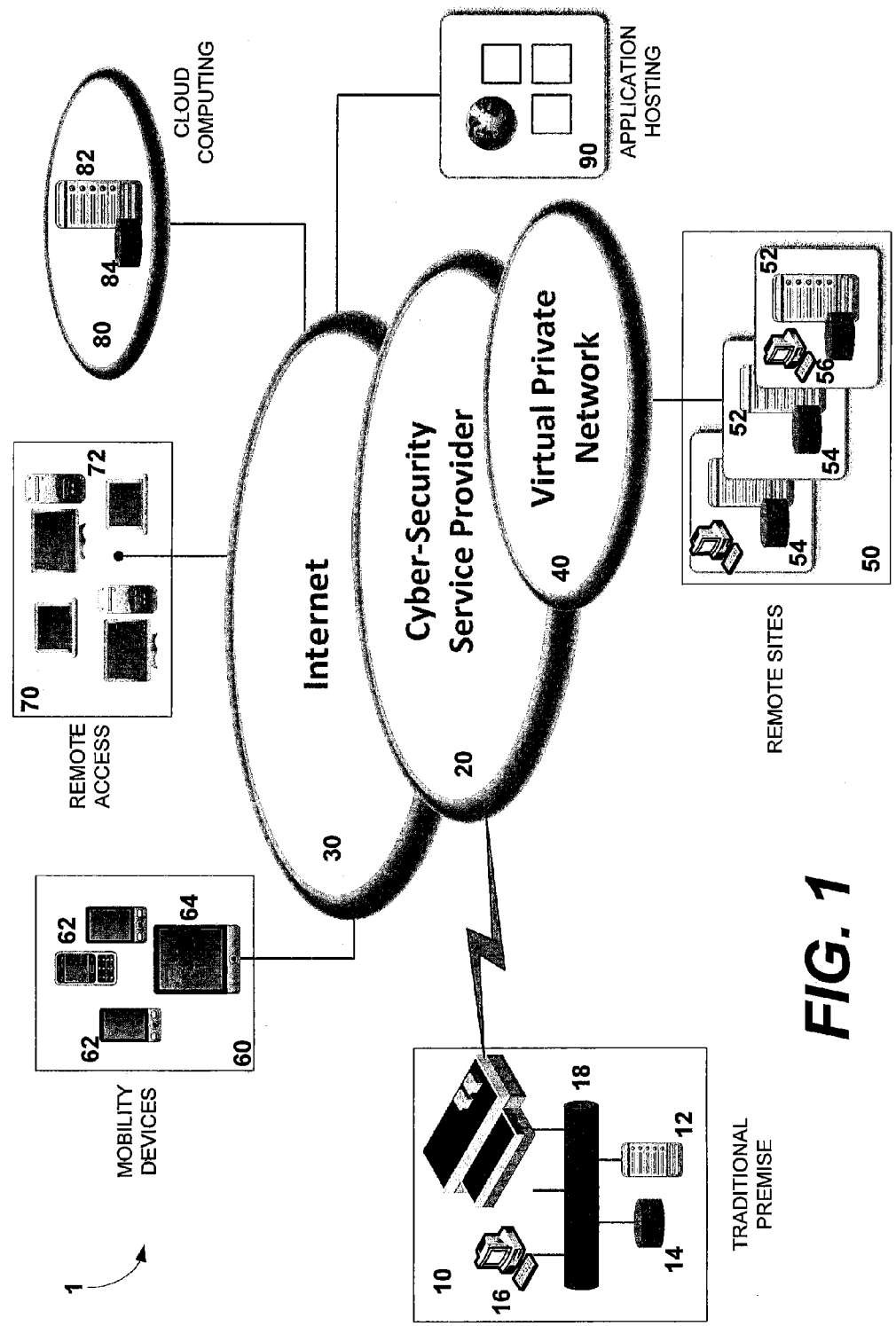
FIG. 1 is a schematic block diagram illustrating a networked computer system for an organization.

While the invention is susceptible to various modifications and alternative forms, specific embodiments thereof are shown by way of example in the drawings and are described in detail herein. It should be understood, however, that there is no intent to limit the invention to the particular forms disclosed, but to the contrary, the invention is to cover all modifications, equivalents, and alternatives falling within the spirit and scope of the invention as defined by the claims.

Pursuant to some embodiments, computer-implemented cyber-security systems are provided that use an open application programming interface architecture that enables seamless integration and delivery of a comprehensive set of cyber-security services and systems to customers such as individuals, businesses, and other organizations. The cyber-security services and systems may be provided by multiple service providers yet delivered to the customers through a common or "integrated" cyber-security threat protection platform. The integrated threat protection platform may be designed so that customers may order desired cyber-security services and systems through the platform, and the ordered services and systems may then be pre-configured, initialized, accessed and run through the integrated platform. By offering multiple distinct cyber-security services through a single integrated platform, including services and systems provided by different entities, subscribers may order a comprehensive set of cyber-security measures and more easily manage their cyber-security program. Herein, the entities that offer cyber-security services and related equipment through the integrated threat protection platform are referred to as "providers."

In some embodiments, a first entity ("the platform operator") may provide and maintain the integrated threat protection platform and define and maintain the open application programming interface that is used to deliver services through the platform. The platform operator may also offer one or more cyber-security services and/or systems through the integrated threat protection platform. Additional entities may also offer cyber-security services and systems through the integrated threat protection platform, using the open application programming interface to deliver these services/systems through the platform so that they may be ordered, installed, configured and/or run through the integrated threat protection platform. These additional entities may self-certify that their cyber-security services and/or systems are compatible with the open application programming interface, and upon such self-certification the platform operator may provide these additional entities access to the integrated threat protection platform. While entities may be allowed to offer services and systems/equipment through the platform upon self-certification, the platform operator may control access to the platform and only allow approved entities access.

In some embodiments, the integrated threat protection platform may be configured so that information regarding various cyber-security threats may be shared between providers. For example, a first provider that provides firewall services may uncover a new virus that is transmitted via certain e-mail messages. The first provider may post information regarding this newly discovered threat into a data store provided via the platform that may be accessed by other providers. A second provider that, for example, provides threat protection for mobile users and assets may access information regarding this new threat from the data store and implement appropriate countermeasures thereto. Thus, the integrated threat protection platform may also allow multiple providers to seamlessly share threat information using the open application programming interface of the integrated platform to provide more responsive and comprehensive cyber-security threat protection.

By providing a mechanism whereby a plurality of providers may offer services and systems through a common platform, the integrated threat protection platform may effectively operate as a two-sided marketplace consisting of customers on one side of the platform, who may purchase and run products and services through the platform, and service providers, hardware vendors and various other entities on the other side of the platform, who provide cyber-security products and services to the customers. Customers may find this arrangement particularly attractive, as they can purchase and/or subscribe to a wide variety of cyber-security threat protection services through the platform and then administer all of these services through a single interface. The two-sided marketplace potentially provides cyber-security service providers, vendors, software developers and consultants access to a large base of potential customers, providing incentives for such providers to conform their cyber-security offerings to be run through the platform. Moreover, the ability of the different cyber-security services to share threat data and identify threats from a very large customer base may enhance the ability of various of the cyber-security services to identify and neutralize new and emerging threats before they can cause significant harm.

Methods and systems for providing comprehensive cyber-security protection to customers using an open application programming interface-based platform solution will now be discussed in more detail with reference to the attached drawings, in which example embodiments are shown.

FIG. 1 is a schematic block diagram that illustrates a networked computer system 1 for an organization. As shown in FIG. 1, the organization may maintain traditional premises 10 which may be one or more physical locations where computing devices such as servers, personal computers, switches, routers, memory storage devices and the like are located. Typically, these locations will be physical offices of the organization. Each such traditional premise 10 may include various computing devices such as servers 12, memory storage devices 14, computers 16, etc. which may be connected via, for example a premise-based wired and/or wireless network 18. Only a single traditional premise 10 is illustrated in FIG. 1 to simplify the drawing.

Each traditional premise 10 may be connected to the Internet or another public network 30. As shown in FIG. 1, the connection to the network 30 may be through a cyber-security service provider 20. The cyber-security service provider 20 may provide a secure network gateway that protects the computing devices 12, 14, 16, 18 at the traditional premises 10 from cyber-security threats that are transmitted through the external network 30. The traditional premise 10 may be connected to a plurality of other sites 50 through a virtual private network 40. The virtual private network 40 refers to protocols that the organization may use to extend a private network (e.g., the network 18 at traditional premise 10) across a public network such as the Internet 30 so that computing devices 12, 14, 16 at the traditional premise 10 may communicate with remote computer devices such as servers 52 and memory storage devices 54 and computers 56 at the remote sites 50 over the Internet 30 as if the remote computing devices, 52, 54, 56 were directly connected to the private network 18. The virtual private network 40 may only allow authenticated remote access and may use tunneling protocols, data encryption techniques and other security measures to prevent unauthorized access to the virtual private network 40 and to protect the confidentiality and integrity of data transmitted across the virtual private network 40. Multi-protocol label switching techniques may be used to route packets across the virtual private network 40. These remote sites 50 may comprise, for example, other traditional premises 10 such as regional offices, satellite locations and the like. As shown in FIG. 1, the connection between the traditional premise 10 and the remote sites 50 may run through the cyber-security service provider 20 so that the cyber-security service provider 20 can monitor for and/or control threats.

As is further shown in FIG. 1, a plurality of mobile users and mobile devices 60 may be connected to the traditional premises 10 and other locations 50 in the networked computer system 1 via the Internet 30. The mobile users and assets 60 may comprise, for example, smartphones 62, tablets computers 64 and cellular enabled computers that access the Internet through, for example, a cellular telephone network. A plurality of remote users and assets 70 may likewise connect to the traditional premises 10 and remote locations 50 via the Internet 30. The remote users/assets 70 may comprise, for example, home computers 72 or other computing devices that remotely access, for example, computers and servers located at a traditional premise 10 using remote access software such as Remote Desktop® or Citrix®. The networked computer system 1 may also include a cloud computing environment 80, which refers to a network of remote servers 82 and data storage devices 84 that are hosted on the Internet 30 that are used to store, mange and process data, as opposed to storing, managing and processing the data on a server that is located at a site maintained by the organization such as the traditional premise 10 or one of the remote locations 50. Finally, the networked computer system 1 may also access application and hosting sites 90 over the Internet 30, which refer to web-based services that allow users to run software applications stored at remote locations on a recurring basis. With such services, a qualified service provider maintains an application on its servers and a user can access and run that application instantly over a web-based connection. The service provider is typically responsible for installing, maintaining, and upgrading the application, for providing security with respect to the application, and for ensuring that the application is made available on a twenty-four hour a day, seven day a week basis or some other pre-defined schedule.

Figure 2:
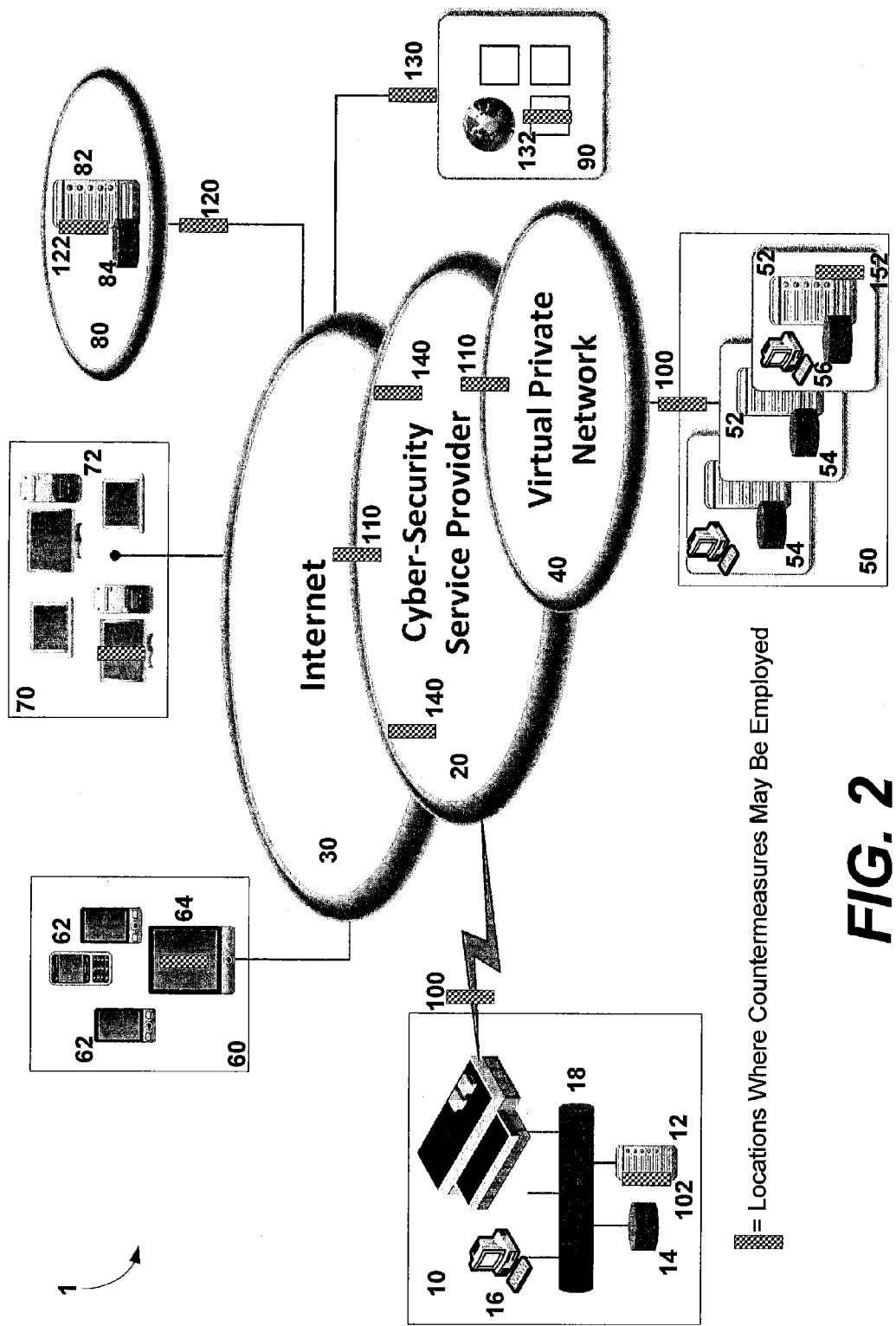
FIG. 2 is a schematic block diagram illustrating locations where software or hardware may be employed in the networked computer system of FIG. 1 to protect against cyber-security threats.

FIG. 2 illustrates locations where cyber-security software or hardware may be employed in the networked computer system 1 of FIG. 1 to protect against cyber-security threats. These locations are identified in FIG. 2 using small, checkered rectangles. As shown in FIG. 2, premise-based gateways 100 may be provided at the interfaces between the private networks at the traditional premises 10 and/or the remote sites 50 and public networks such as the Internet 30. These premise-based gateways 100 may comprise hardware and/or software that are designed to prevent unsecured traffic from entering the internal networks of the organization to protect the computing devices of the organization from unauthorized access and from malicious transmissions such as viruses, worms, malware and the like. The gateways 100 are typically installed at the boundary between the private network (e.g., network 18) and the Internet 30. These gateways 100 may be implemented using firewalls, virus and malware detection software and the like. Additional software-based security systems 102, 152 may be hosted at the traditional premise 10 and/or the remote sites 50. Network-based security gateways 110 may be provided at network interconnections such as at the interconnection between the cyber-security service provider 20 and the Internet 30 and the interconnection between the cyber-security service provider 20 and the virtual private network 40. Hosted security gateways 120 may be provided at the interconnection between the cloud computing environment 80 and the Internet 30 and virtual security gateways 130 may be provided at the interconnection between the application and hosting sites 90 and the Internet 30. The cloud computing and application hosting sites 80, 90 will typically host additional security infrastructure 122, 132 that is maintained and operated by the cloud computing and application hosting service providers. Mobile device management software that includes cyber-security features is typically provided on the mobile devices and assets 60 and endpoint security software is typically provided on the remote devices and assets 70.

The cyber-security service provider 20 may provide a plurality of security systems 140 that are designed to identify and neutralize cyber-security threats to the organization. These systems may include, for example, intrusion detection services that identify unauthorized attempts to access a private network by real-time analysis of all traffic through an interface for known "attack signatures," intrusion prevention services that provide advanced information regarding various types of emerging attacks (viruses, worms, etc.) so that such attacks may be filtered and eliminated before they reach an organization, denial of service attack protection, network monitoring tools, network analytics and the like.

Figure 3:
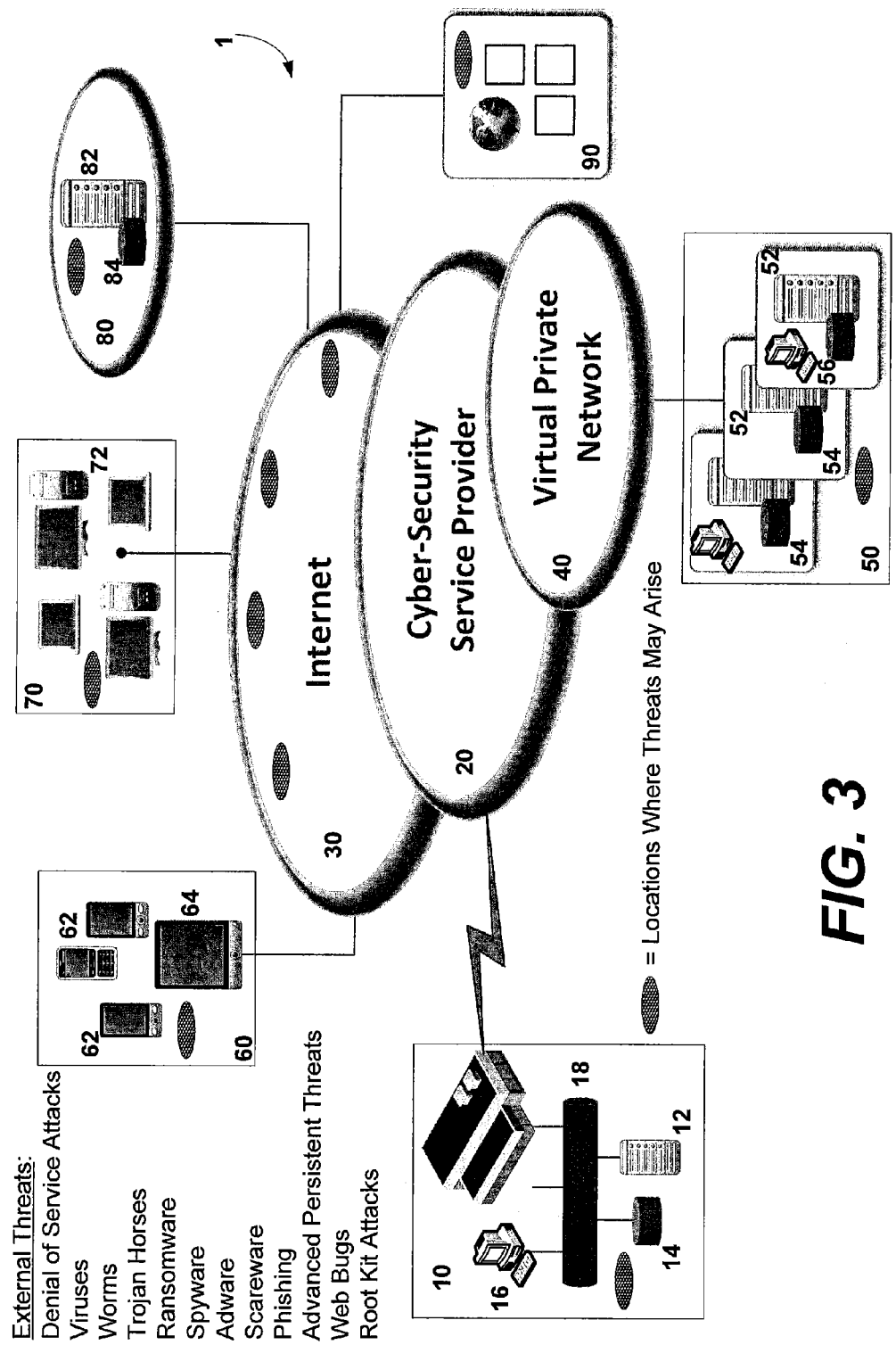
FIG. 3 is a schematic block diagram illustrating examples of the type of cyber-security threats that may attack the networked computer system of FIG. 1.

FIG. 3 illustrates examples of the types of cyber-security threats that may attack the example networked computer system 1 of FIG. 1 and example locations where these threats may arise. As shown in FIG. 3, the networked computer system 1 may be subject to a wide variety of threats, including, for example, denial of service attacks, malware (i.e., malicious software that is designed to disrupt computer operation or steal stored information) such as computer viruses (malware that replicates itself into other computer programs, data files, hard drives or the like for a variety of malicious purposes), worms (malware that replicates and spreads the copies to other computers for a variety of malicious purposes), trojan horses (non-self-replicating malware that is typically designed to destroy or steal data that is stored on an infected computing device), ransomware (malware that restricts access to a computing device by, for example, encrypting files thereon, and that demands payment for removal of the restriction), spyware (software that gathers information about a person or organization, often for advertising purposes, but also for stealing passwords, bank or credit card information and the like), adware (software that displays unwanted advertisements), scareware (malware that delivers alarming warnings or threats to users that are typically designed to trick users into loading other malware onto their computer or to visit websites selling products), phishing communications (communications designed to trick users into revealing sensitive information such as usernames, passwords, banking information and/or credit card numbers), advanced persistent threats (stealthy and continuous hacking processes that are orchestrated by individuals, crime syndicates or government agencies that are typically targeting specific entities), web bugs or beacons (objects secretly embedded into web pages, e-mails and the like that allow an originator to determine if other users have viewed the web page or e-mail) and root kit attacks (secret installation of malware into operating system software that can modify other files on the computer to hide its existence).

Most typically, the threats to a networked computer system such as the system 1 of FIGS. 1-3 are external threats generated by hackers, criminals, government agencies (e.g., foreign government stealing classified information or intellectual property), activists or other commercial entities. However, internal threats must also be considered, such as employees or contractors who are spies, involved in criminal activities and/or are generally disgruntled who may seek to steal information or destroy data or devices. The various locations where these threats may attack a networked computer system are illustrated in FIG. 3 by the horizontal, checkered ovals.

Figure 4:
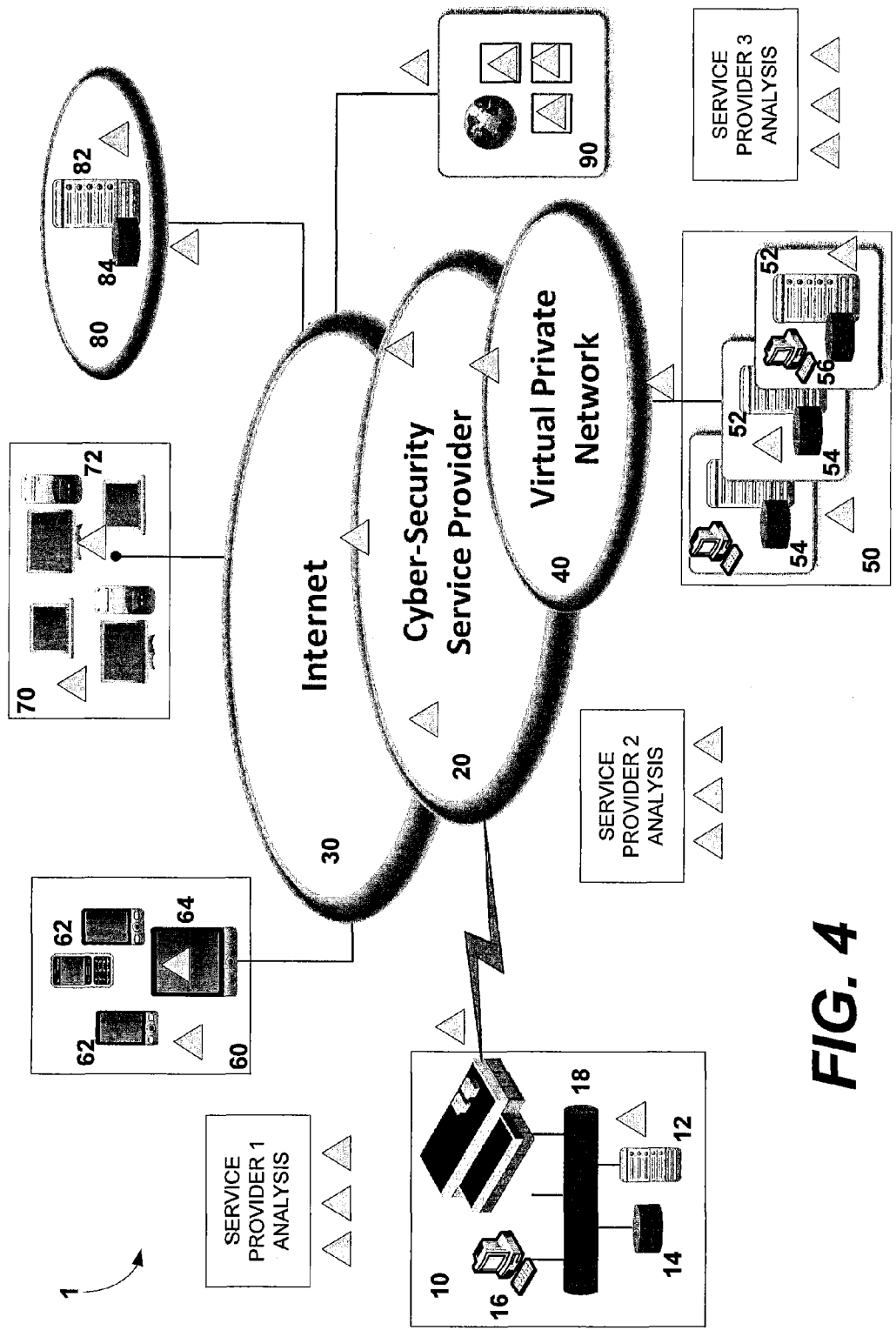
FIG. 4 is a schematic block diagram illustrating locations where information regarding identified or potential cyber-security threats may be gathered in the networked computer system of FIG. 1.

As is shown in FIGS. 2 and 3, both the cyber-security threats to the networked computer system 1 and the countermeasures that may be employed to address those cyber-security threats are widely distributed. As a result, information that is developed in countering the cyber-security threats may also be widely distributed throughout the network and may be developed by software and hardware systems that are operated by different providers. This phenomena is illustrated in FIG. 4, which uses shaded triangles to reflect locations where information regarding cyber-security threats may be developed in relation to the networked computer system 1 of FIGS. 1-3.

Information that is developed regarding many cyber-security threats may be critical in countering those threats. For example, many worms, computer viruses, phishing e-mails and denial of service attacks have readily identifiable "signatures" that, if known, allow communications associated with these threats to be identified as they pass through the network. If these signatures are known, firewalls and software at, for example, the network and premise gateways 100, 110 (see FIG. 2) may identify and quarantine these communications before they gain access to, for example, private networks 40.

One difficulty that may arise in using information that is developed regarding various cyber-security threats is that different providers that develop information regarding specific cyber-security threats may not have an effective method for sharing the information. For example, referring to FIG. 4, a first provider that operates a network gateway 110 may identify a signature for a new computer virus. A second provider may provide virus software that is downloaded (with automatic updates) to mobility devices such as smartphones and tablet computers that connect to the networked computer system 1. The first provider may have no mechanism to notify the second provider regarding the identified signature for the computer virus, and hence mobility devices 62, 64 may become infected until such time that the second provider likewise identifies the computer virus and isolates a signature therefore.

In some embodiments, the integrated threat protection platforms disclosed herein may include various data stores where providers can post information regarding identified threats. The open application programming interface for the platform may specify formats that may be used to post the information regarding the threats in these data stores so that the cyber-security services and systems of other providers may automatically start responding to these threats once information regarding them is incorporated into the data store. As one simple example, signatures for identified phishing e-mails may be stored in a data store of the integrated threat protection platform by any of the providers who provide cyber-security services through the platform (or by a pre-approved subset of such providers). The signatures may be stored in the data store using a format that is pre-defined in the open application programming interface so that cyber-security software of other providers may be programmed to automatically pull the signature from the data store and use it to enact countermeasures against this particular threat. Thus, the open application programming interface may not only allow multiple providers to offer services to customers through a common platform, but it may also be used to allow these providers to share cyber-security threat information and to automatically use the shared-information to quickly neutralize newly emerging cyber-security threats.

Figure 5:
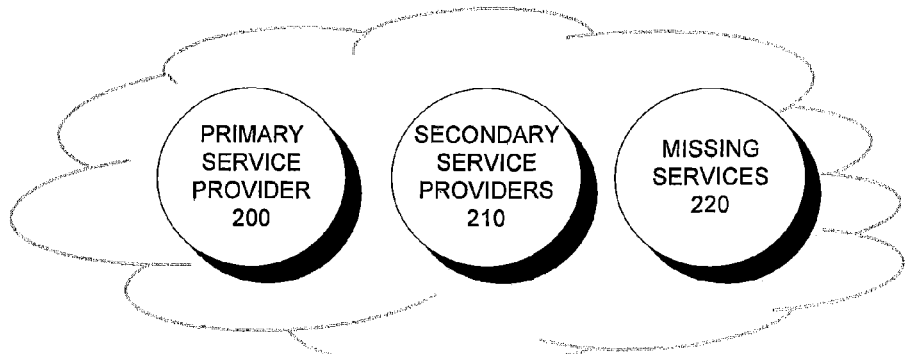
FIG. 5 is a schematic block diagram illustrating the existing security posture of a typical business or organization.

FIG. 5 is a schematic block diagram that illustrates the existing security posture of a typical business or organization. As shown in FIG. 5, the organization may typically have a primary cyber-security provider 200 that provides multiple cyber-security services for the organization such as, for example, firewalls, computer virus detections and isolation, spyware and adware protection and the like. Additionally, an organization will often have cyber-security services or systems that are provided by one or more additional "secondary" third party security providers 210 that provide specialized cyber-security services. These additional cyber-security services may be directed, for example, to protecting computing assets of the corporation that are relatively unique or to protecting certain classes of devices (e.g., mobile devices, remote access devices, cloud computing, etc.) Typically, there also will be a number of security threats which the organization is not protected against, or which the organization has cyber-security systems or services that are inadequate to protect against the full range of the threat. These may be viewed as "missing" cyber-security services 220.

Figure 6:
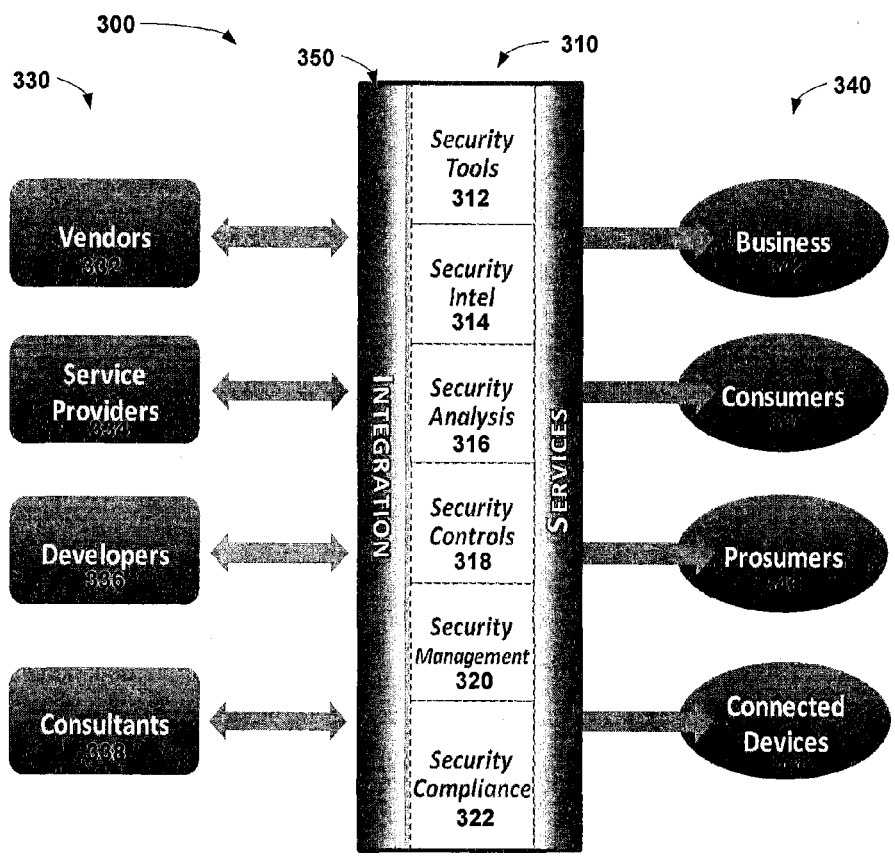
FIG. 6 is a schematic block diagram of an integrated cyber-security threat protection platform according to some embodiments that illustrates the entities that may provide or receive services via the platform and the services that may be provided through the platform.

Pursuant to some embodiments, integrated threat protection platforms are provided that may provide greatly enhanced cyber-security to customers such as businesses and organizations. FIG. 6 is a block diagram of one such integrated threat protection platform 300. As shown in FIG. 6, the integrated threat protection platform 300 may host a wide variety of cyber-security systems and services 310 including, for example, security tools 312, security intelligence 314, security analysis 316, security controls 318, security management 320 and security compliance 322. A wide variety of customers 340 such as businesses and other organizations 342, consumers 344, professional consumers ("prosumers") 346 and other connected devices 348 may access these security services 310.

As noted above, the platform 300 may operate under an open application programming interface 350. An application programming interface refers to a specification that sets forth how software components interact with each other and/or with associated hardware. For example, application programming interfaces are commonly used to specify how software programs access computer database or computer hardware. Application programming interfaces may also be used to obtain access to software. An "open" application programming interface refers to an application programming interface that is made available to a plurality of users so that all of the users may access a common platform, system or software program. An open application programming interface may take the form of vendor documentation that specifies, for example, how external software programs may access hardware of a platform or system and software running thereon.

Referring again to FIG. 6, it can be seen that a plurality of different entities or "providers" 330 may use the platform 300 to provide services and/or systems to the customers 340. These providers 330 may include, for example, service providers 334 that provide subscription cyber-security threat protection services to the customers 340. In addition, other providers 330 such as vendors 332, software developers 336 and consultants 338 may also access the platform 300 via the open application programming interface 350.

In some cases, one of the providers 330 may be an operator of the platform 300. For example, one of the providers 330 may build and/or maintain the platform 300 and allow other providers 330 to have access to the platform 300 as this may provide synergistic effects, as is explained in detail further below. The platform operator may, for example, publish the specifications for the open application programming interface 350 and may also control who does and does not have access to the platform 300. This access control may be used to ensure that individuals or entities who originate cyber-security threats do not gain access to the platform 300 (as if they have such access, it may be possible to neutralize or avoid various of the cyber-security threat protection countermeasures provided through the platform 300) and because it may be important to ensure that only quality products and services are offered through the platform 300.

As noted above, select software developers 336 may be provided access to the platform 300. Such software developers 336 may develop code that may be integrated into more comprehensive cyber-security threat protection packages that are offered by the various service providers 334. For example, a software developer 336 may produce a software subroutine that is designed to identify and neutralize a certain type of cyber-security threat. The software developer 336 may use the specifications of the open application programming interface 350 to ensure that this sub-routine will operate correctly when integrated into a software package that is run through the platform 300. A variety of different service providers 334 may incorporate the subroutine into threat protection services that they offer through the platform 300.

Still referring to FIG. 6, the vendors 332 may comprise, for example, hardware vendors who do not provide subscription cyber-security services, but who sell hardware (e.g., firewalls) that are used in implementing cyber-security services. By using the open application programming interface 350, the hardware vendors 332 may offer their products for sale to the customers 340 through the integrated threat protection platform 300. Moreover, customers 340 who purchase hardware through the platform 300 can provide necessary information (e.g., pre-configuration information) to the vendors 332 through the platform 300 and may administer the purchased hardware through the platform 300. Moreover, since the hardware is run through the platform 300, cyber-security threat data generated by the hardware may be readily made available to other cyber-security threat protection services that are provided through the platform 300.

Figure 7:
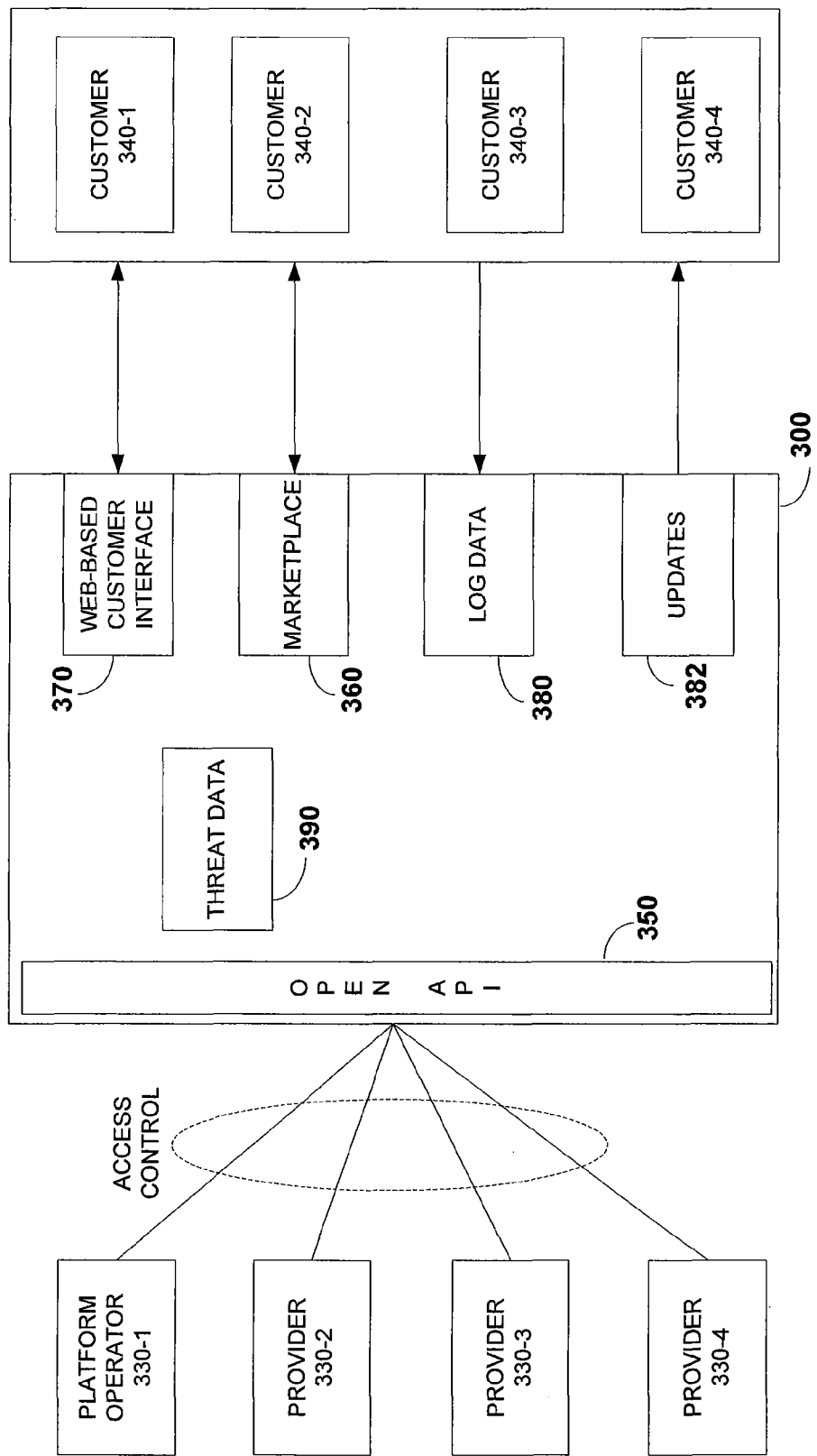
FIG. 7 is a schematic block diagram of the cyber-security threat protection platform of FIG. 6 that illustrates how subscribers, service providers and others may provide and receive services through the platform.

FIG. 7 is a block diagram illustrating operation of the integrated threat protection platform 300 of FIG. 6 in greater detail. As shown in FIG. 7, the integrated threat protection platform 300 includes the open application programming interface 350 that allows a plurality of providers 330 to provide cyber-security protection services through the platform. These providers 330 may include the platform operator 330-1 and a plurality of third party providers 330-2 through 330-4. The providers 330 may be, for example, vendors 332, service providers 334, software developers 336 and/or consultants 338.

As shown in FIG. 7, while the platform 300 has the open application programming interface 350, the platform operator 330-1 may exercise access control over the platform 300. Consequently, not just any provider 330 may gain access to the platform 300, but instead only providers 330 that are approved by the platform operator 330-1. In this manner, the platform operator 330-1 may ensure that only reputable service providers provide services and systems through the platform 300, and providers 330 who do not meet this standard may be denied access or have their access revoked. Additionally, the platform operator 330-1 may also only allow providers 330 access to the platform 300 that provide services or equipment that compliment the services and equipment provided by the platform operator 330-1 through the platform 300 so that direct competitors of the platform operator 330-1 may not use the platform 300 to compete with the platform operator 330-1.

As is further shown in FIG. 7, a plurality of customers 340 may also access the platform 300. These customers 340 may comprise, for example, businesses 342, consumers 344 and/or professional consumers 346. Typically, these customers 340 will subscribe to one or more cyber-security threat protection services offered by one or more of the service providers 334. The customers 340 may also purchase hardware such as firewalls and the like from vendors 332 through the platform 300 (see FIG. 6).

The customers 340 may purchase cyber-security threat protection services and related hardware systems through a marketplace 360. The marketplace 360 may comprise, for example, a website that lists the services and systems that can be purchased and/or delivered to customers 340 through the platform 300, including both services provided by the platform operator 330-1 and services and systems provided by other third party providers 330-2 through 330-4. Using the open application programming interface 350, the third party providers 330-2 through 330-4 will have access to the marketplace 360 so that they may list their products and services within the marketplace 360 and provide associated information such as pricing, customer reviews, technical specifications, installation instructions, and any other materials that a provider 330 would normally provide on their own commercial websites. The marketplace 360 thus serves as a commercial website for a plurality of providers 330.

The platform 300 further includes a web-based customer interface 370. Each customer 340 may access the platform 300 through their own customer interface 370. Customers 340 may use this interface 370 to input information necessary for pre-commissioning services or systems, to review cyber-security threat information provided by the service providers 334, to access software patches and other information provided by the service providers 334 and to otherwise manage their cyber-security services. The customer interface 370 may act as a unified interface that allows each customer 340 to receive information from, and provide information to, all of the service providers 334, vendors 332 and any consultants 338. Thus, individuals at each customer 340 who are in charge of cyber-security compliance may only need to learn and use a single interface 370 to interact with all of their cyber-security providers 330.

In many instances, the various service providers 334 who provide cyber-security threat protection services to a particular customer 340 may need access to the same information from the customer 340. For example, servers, switches, firewalls, routers and other computing devices at the customer 340 may generate log data 380 that identify potential security threats and the like. Customers 340 who use the platform 300 may transmit this log data 380 to the platform 300 a single time (although it will be appreciated that this information will typically be forwarded to the platform 300 on a periodic basis as these logs are constantly being updated). The platform 300 may then be programmed to provide the specific portions of the log data 380 that is required by each service provider 334. Thus, the platform 300 may reduce the amount of information that each customer 340 may need to forward to its service providers 334 as all of the information may be sent to a single place (the platform 300) where it is then distributed as needed to the service providers 334.

As shown in FIG. 7, the log data 380 and software updates 382 (and any other information that the service providers 334 may forward to a customer 340 through the platform 300) will typically not pass through the marketplace 360 or the web-based customer interface 370, but instead may be passed transparently. By way of example, a service provider 340 may periodically (i.e., from time-to-time, but not necessarily on a fixed schedule) forward software updates for virus protection software that may be installed on various computing devices at a particular customer 340. These software updates may be transmitted to and installed on the computing devices at the customer automatically, with no need for input from the customer and in a manner that is completely transparent to the customer 340, if desired. Likewise, the platform 300 and/or the service providers 334 may automatically and transparently access the log data 380 on the computing devices at the customers 340.

As is further shown in FIG. 7, threat data 390 may also be collected and stored at the platform 300. The service providers 334 each will typically perform their own security monitoring, security analysis and security intelligence functions, and will typically do so for a large number of customers 340. As such, each service provider 334 may independently develop information regarding various cyber-security threats. As new cyber-security threats are constantly arising, it will typically be the case that different service providers 334 will identify different threats at different times, with different service providers 334 being better situated to identify various types of cyber-security threats more quickly, if at all.

Because an open application programming interface 350 is provided, in some embodiments the platform 300 may be designed so that the service providers 334 may share information regarding different threats that are identified. By way of example, a firewall vendor 332 may analyze data returned by a firewall and identify a new denial of service attack. The firewall vendor 332 may post information regarding this newly identified threat to the platform 300 and this information may be stored in the threat data store 390. In some embodiments, the open application programming interface 350 may specify the format as to how the threat data is stored in threat data store 390 so that this threat data may be automatically accessed by other service providers 334 and incorporated into their threat protection services. Thus, the platform 300 may provide a mechanism through which a first service provider 334 may share information regarding a new or and emerging threat with the other service providers 334, and the information may be provided in a way that the other service providers 334 may automatically generate countermeasures for the newly identified threat. Thus, for example, a service provider 334 who provides virus protection software for mobile devices may use the threat data posted by the firewall vendor to deploy countermeasures to the new threat at an earlier stage.

As noted above, the platform operator 330-1 may control access to the platform 300. However, in some embodiments, the platform operator 330-1 may allow approved providers to self-certify that the products and/or services that they offer to customers through the platform 300 are fully compliant with the platform 300 and will run properly through the platform 300. Thus, the platform operator 330-1 need, in some embodiments, only provide the specifications for the open application programming interface 350 and judiciously select the providers 330 who are given access to the platform 300, and need not test and pre-clear services and products that are provided by other providers 330 through the platform 300.

Figure 8:
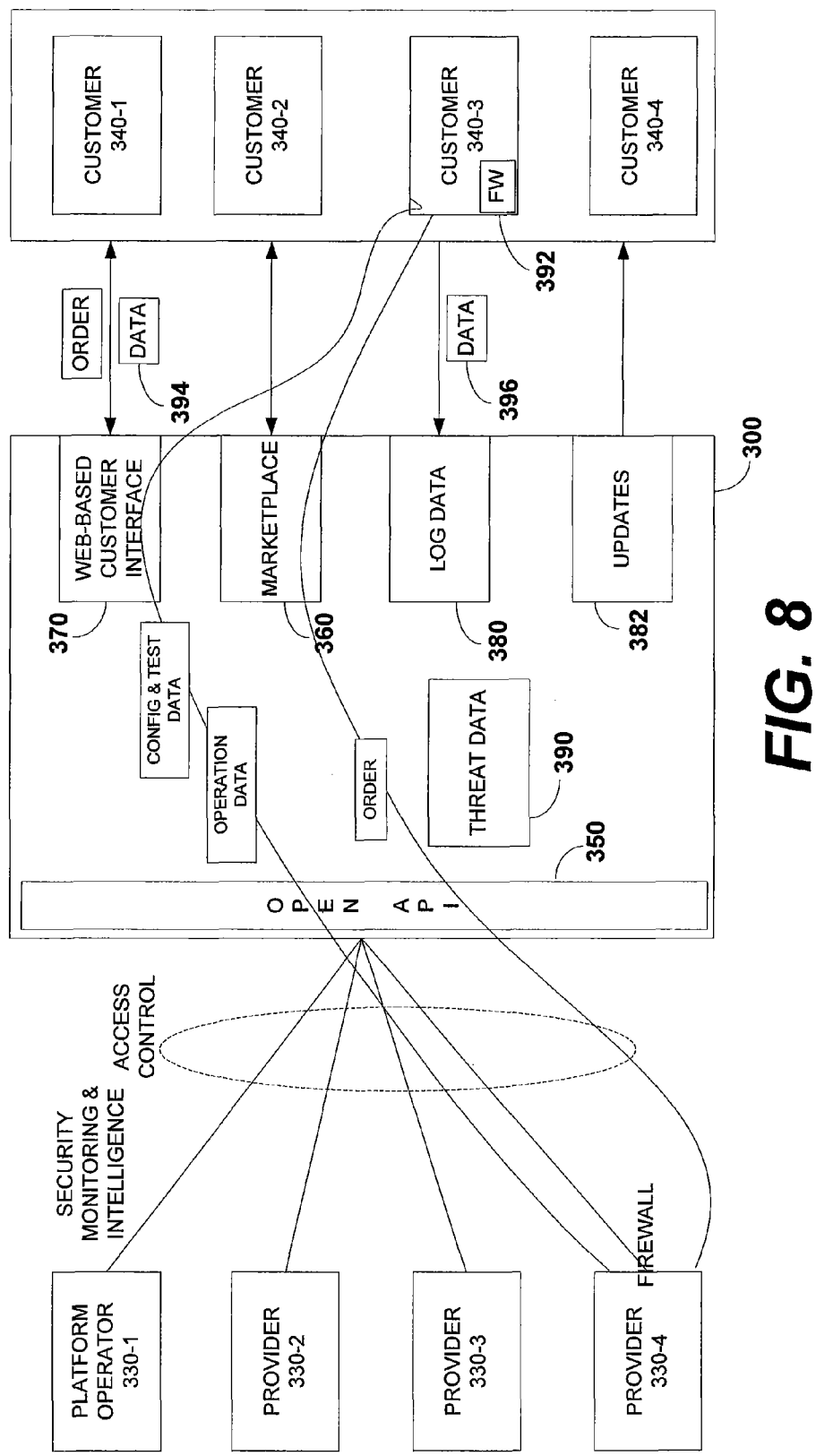
FIG. 8 is a schematic block diagram of the cyber-security threat protection platform of FIG. 6 that illustrates how a customer may purchase hardware through the platform.

FIG. 8 provides a simple example regarding how the platform 300 may provide an improved interface for both providers 330 and customers 340. As shown in FIG. 8, a first provider 330-1, who is also the platform provider, offers a host of security services such as denial of service attack mitigation, e-mail and web filtering services, security even and threat analysis services, private network protection services, etc. The first provider 330-1, however, specializes in security monitoring and intelligence and does not manufacture security hardware such as, for example, hardware firewalls. Provider 330-4 may be a hardware firewall vendor may offer hardware firewalls through the marketplace 360. As discussed above, using the open application interface 350, the hardware vendor 330-4 may add its firewalls to lists of firewalls and other cyber-security services and equipment that are available through the marketplace 360 by writing a software program that is compliant with the open application programming interface 350 that will add the firewalls to the list of available firewalls that is published to customers 340 through the marketplace 360. This software program may not only identify the firewalls that are available, but may also provide more detailed information regarding each firewall, such as performance specifications, interface specifications, cost information, warranty information and the like.

As shown in FIG. 8, a customer 340-3 may order a firewall 392 from the hardware vendor 330-4 through the marketplace 360, and may provide data 394 to the hardware vendor 332 that is required so that the firewall 392 may be properly configured when shipped to the customer 340-3. Once the firewall 392 is installed (either by the customer 340-3, by the hardware vendor 330-4 or another service provider), the firewall 392 can be commissioned and tested by the hardware vendor 330-4 through the web-based customer interface 370 of platform 300. Once up and operating, the firewall 392 may be administered through the platform 300, and may also provide information such as threat data 390 to other providers 330 that are operating through the integrated threat protection platform 300.

It will be appreciated that, in some cases, all aspects of a service may not be delivered through the integrated threat protection platform 300. For example, a customer 340 may subscribe to a threat monitoring cyber-security service that is offered by a first provider 330-1 through the integrated threat protection platform 300. The provider 330-1 may work with the information technology ("IT") department of the customer 340 to determine the computing equipment that the customer 340 is using and to ensure that this equipment is configured to forward appropriate information to the first provider 330-1 through the platform 300. This process may be accomplished via telephone calls, on-site visits or the like and may ultimately result in the servers, firewalls, switches and other computing equipment of the customer 340 being configured to automatically forward log data 382 and other information to the provider 330-1. The provider 330-1 may monitor the information that is received from this computing equipment and compare it to known threat information to provide alerts to the customer 340 as needed. The provider 330-1 may likewise send updates to computing equipment at the customer 340 though the platform 300 that are designed to counter identified and/or emerging cyber-security threats.

In some embodiments, the platform operator 330-1 may charge other third party service providers 334, vendors 332 and/or consultants 338 for access to the platform 300 and the base of customers 340. For example, in some cases, the platform operator 330-1 may already have a large base of customers 340 purchasing cyber-security threat protection services. Other service providers 334 and vendors 332, for example, who offer complimentary products, may desire access to this base of customers 340 and certification by the platform operator 330-1 that their products and services are endorsed by the platform operator 330-1. The integrated threat protection platform 300 provides a mechanism whereby the platform operator 330-1 may readily provide that certification and provide the other third party service providers 334 and vendors 332 access to the base of customers 340 for a fee such as a royalty, a fixed fee, etc. Thus, the platform 300 may (1) serve as a revenue source for the platform operator 330-1, (2) allow the platform operator 330-1 to offer a more comprehensive set of services and equipment to its customers 340, (3) provide an enhanced experience for the customers 340 by providing access to multiple service providers 334 and vendors 332 through a single, common user interface 370, (4) guide customers 340 to purchase complimentary services and equipment from approved vendors 332 and service providers 334 and (5) allow for the sharing of threat data between service providers 334 and vendors 332 so that may enhance the overall cyber-security threat protection provided.

In some embodiments, the services offered through the integrated threat protection platform 300 may be expanded to include services that extend beyond cyber-security services. Customers 340 that rely on outside service providers for cyber-security services may also often outsource other computing services such as asset management, billing and customer care services and the like. As these customers 340 become experienced in using the integrated threat protection platform 300 for cyber-security services, a natural expansion is to offer additional services through the common platform 300 so that the platform 300 becomes a web-based marketplace where customers 340 can purchase hardware and subscribe to software services that are then delivered to the customers 340 and administered by the customers 340 through a common, familiar interface 370. Third party service providers 334 can fill in gaps in the suite of services offered by the platform operator 330-1. Many smaller customers 340 such as small businesses and other organizations may find it very efficient to be able to purchase and administer all of their software needs through a common platform 300 that eliminates the need for operators to become familiar with disparate user interfaces for a variety of different software packages.

Figure 9:
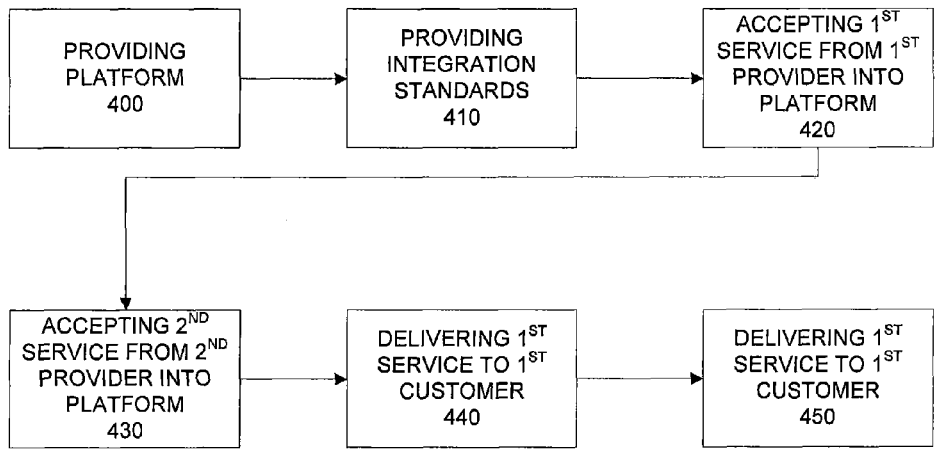
FIG. 9 is a flow chart illustrating operations for a method of providing cyber-security threat protection to a plurality of customers according to some embodiments.
Figure 10:
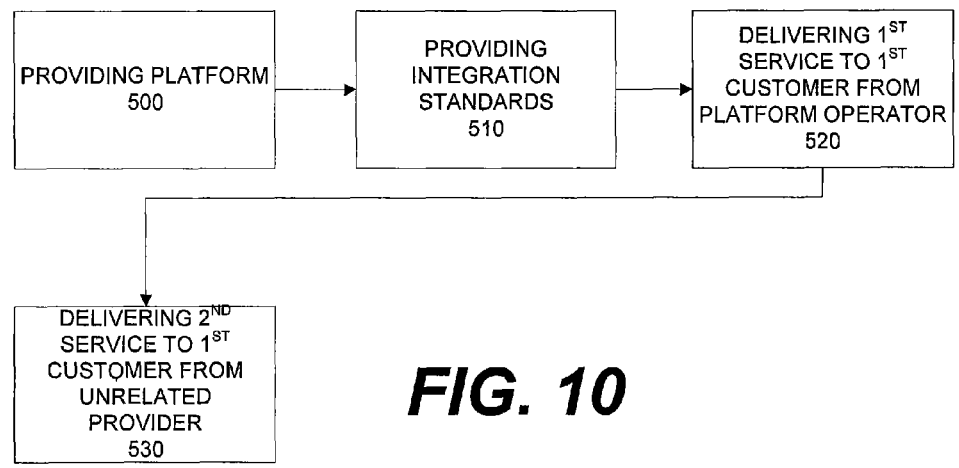
FIG. 10 is a flow chart illustrating operations for providing cyber-security services and products to a plurality of customers according to further embodiments.

FIGS. 9 and 10 are flow chart diagrams that illustrate operations according to example embodiments.

As shown in FIG. 9, in some embodiments, methods of providing cyber-security services to a plurality of customers are provided in which a platform operator may provide a platform that includes (1) a computer implemented user interface that is accessible by customers, and (2) an application programming interface that is configured to allow a platform operator and other third party providers to offer computer implemented cyber-security services to the customers through the computer implemented user interface (block 400). The platform operator may also publish or otherwise provide integration standards for the application programming interface to the third party providers (block 410). These integration standards may specify how the computer implemented cyber-security services can be integrated into the platform.

A first computer implemented cyber-security service that is provided by a first of the third party providers may be accepted and integrated into the platform. The first computer implemented cyber-security service may be self-certified by its provider as being operable through the platform (block 420). Likewise, a second computer implemented cyber-security service that is provided by a second of the third party providers may be accepted and integrated into the platform (block 430). The second computer implemented cyber-security service may also be self-certified by its provider as being operable through the platform. The first computer implemented cyber-security service may be delivered to a first of the customers through the platform (block 440) and the second computer implemented cyber-security service may be delivered to a second of the customers through the platform (block 450).

Turning now to FIG. 10, a method for a platform operator to provide cyber-security services and products to a plurality of customers is illustrated. As shown in FIG. 10, pursuant to this method, a platform may be provided that includes (1) a web-based marketplace that is accessible by each of the plurality of customers, the marketplace identifying the cyber-security services and products that are available for purchase and (2) a web-based interface for each of the plurality of customers who purchases at least one cyber-security services or products (block 500). The platform provider may also publish integration standards for an open application programming interface for the platform to a plurality of unrelated third party providers (block 510). A first cyber-security service that is offered by the platform operator may be delivered through the platform to a first customer (block 520) and a second cyber-security service that is offered by one of the unrelated third party providers may likewise be delivered to the first customer through the platform (block 530).

Figure 11:
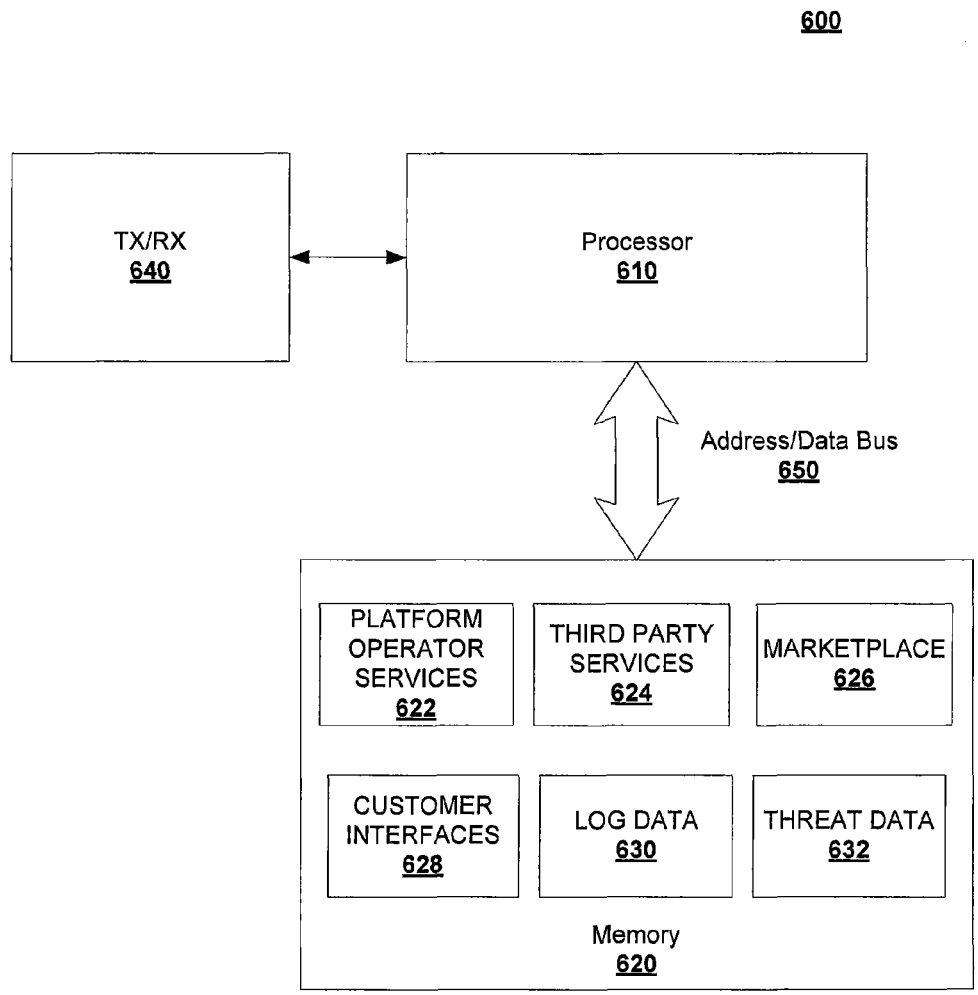
FIG. 11 is a block diagram of a data processing system that is configured to provide cyber-security services from a plurality of providers to customers according to some embodiments.

FIG. 11 is a schematic block diagram of a data processing system 600 that is configured to perform the operations of the methods according to some embodiments. As shown in FIG. 11, the system 600 includes a processor 610, a memory 620, a transmitter/receiver 640 and an address/data bus 650. The processor 610 can be any appropriate processor, such as processors that are used in commercially available servers. The processor 610 may communicate with the memory 620 via the address/data bus 650. The processor 610 may comprise a plurality of distributed processors.

The memory 620 is representative of the overall hierarchy of memory devices. The memory 620 can include, but is not limited to, the following types of devices: cache, ROM, PROM, EPROM, EEPROM, flash memory, SRAM, and DRAM. The memory 620 may include one or more cyber-security services 622 that are offered and run by the platform operator through the data processing system 600. These services 622 may take the form of, for example, software programs run on the processor 610 that implement specific cyber-security services such as, for example, monitoring services, quarantine services, detection services and the like for one or more customers. These software programs may collect information from the customers, process this information, and take appropriate actions such as quarantining potentially harmful communications to the customers, raising alerts at the customers, adjusting filters at the customers, etc. The software programs may be updated on a regular basis as new and emerging cyber-security threats are identified and countermeasures therefore developed. These updates may be manual or automatic updates.

The memory 620 may also include one or more cyber-security services 624 that are offered and run by third party service providers who are granted access to the data processing system 600. These services 624 may also take the form of, for example, software programs run on the processor 610 that implement additional cyber-security services in a manner similar to the services 622 described above. While in the embodiment of FIG. 11, platform operator services and the cyber-security services 624 that are offered and run by third party service providers are all shown as being stored in memory 620 and run on processor 610, it will be appreciated that the memory 620 may comprise a plurality of memory devices that may not be co-located, and that the processor 610 may likewise comprise a plurality of processors that are not co-located with each other. Thus, for example, one of the third party services 624 may comprise a software program that is stored on a remote memory and run on a remote server that delivers a cyber-security service to a customer through the data processing system 600.

The memory 620 may further include a software program 626 that runs on the processor 610 that implements the marketplace. The software program 626 may be a conventional website program that is configured via the open application programming interface to allow various third party providers to include information regarding the products and services that they are offering through the system 600 within the marketplace (i.e., within the website that may be accessed by customers). The memory 620 also includes software 628 that runs on the processor 610 that implements the customer interface for each customer. The memory 620 may also store log data 630 and threat data 632 as described above.

The integrated threat protection platforms described herein may provide a number of advantages as compared to conventional approaches for providing cyber-security threat protection services to customers. As discussed above, by using an open application programming interface architecture, cyber-security services and systems from multiple providers and vendors may be seamlessly delivered to customers through a single platform that may be easier for the customers to understand and use. Additionally, the open application programming interface facilitates service providers adding new services in the future that can be readily integrated into the platform and offered to customers. Moreover, related services that may not necessarily relate to cyber-security threat protection may also be integrated into the platform and offered and delivered to customers. Moreover, where customers provide their own, in-house cyber-security services to address particular threats that may be unique to a particular customer, the open application programming interface architecture allows the customers to integrate these in-house cyber-security services into the platform (or the platform operator may do the integration for the customer) so that the customers may access and control all of their cyber-security services through a common interface.

Customers also benefit from the availability of the integrated threat protection platforms according to some embodiments as to a customer the platform may appear as a marketplace where the customer may shop for all of the services necessary for protection against the cyber-security threats that are relevant to the customer's operations. Moreover, once such a customer subscribes to these services, the services may be delivered to the customer through a common user interface that allows the customer to conveniently access and manage all of its cyber-security systems through a single interface.

The open application programming interface also allows software developers, hardware vendors and consultants to provide systems and services through the platform. For example, hardware vendors that sell cyber-security hardware such as physical firewalls and the like may offer such hardware to customers through the integrated threat protection platform. The open application programming interface allows such hardware vendors to market their products to customers through the platforms web-based customer interface. Customers purchasing such hardware can provide necessary information (e.g., pre-configuration information) to the vendors through the platform and may administer the hardware through the platform. Moreover, since the firewall is run through the platform, cyber-security threat data generated by the firewall may be readily made available to other cyber-security threat protection services that are provided to the customer through the platform.

Software developers may also generate cyber-security threat protection programs that are designed to run on the platform through the open application programming interface. These programs may be sold or licensed to cyber-security service providers and integrated into the cyber security services that these service providers offer through the integrated threat protection platform. By way of example, a particular service provider may offer a cyber-security service that protects data that is stored in the cloud from certain cyber-security threats. Implementation of this service may require accessing cyber-security related threat data that is stored at various locations such as at gateways or firewalls so that this data may be used to identify characteristics of certain types of threats to the cloud-stored data. A software vendor may develop a program that runs under the open application programming interface to collect such data, and various service providers may then purchase or license this program rather than building such a program from scratch. Thus, software developers may make develop programs that may be shared by multiple service providers which may make it easier for these service providers to conform their cyber-security services to operate through the integrated threat protection platform.

As yet another example, some customers may need help from cyber-security consultants who can analyze the performance of their overall cyber-security program and identify when additional cyber-security protection is required. Such consultants can develop software that allows them to monitor the cyber-security services that are used by a particular customer to determine if it is providing a sufficient level of cyber-security protection. Using the open application programming interface, these consultants may develop software that allows them to remotely monitor the cyber-security threat data generated by the cyber-security services that a particular customer is currently using and other information regarding the customer's computer systems to determine if the customer is sufficiently protected. The integrated threat protection platform thus may provide an easy way for security consultants to deliver consulting services to customers.

The platform developer may maintain control of who has access to the platform, and may thereby protect customers from low performing service providers, scam artists and the like. However, the platform developer may also allow trusted service providers to self-certify that the products and/or services that they offer through the platform are fully compatible with the platform. Thus, the platform developer may avoid any need to test and validate third party products and services.

The platform may also provide synergistic effects, as the platform may effectively operate as a two-sided market environment consisting of customers on one side of the platform who may purchase and run products and services through the platform, and service providers, hardware vendors, software developers and consultants on the other side of the platform, who provide the products and services to the customers. The existence of a large customer base on the first side of the market provides incentive to vendors, service providers and others to offer services through the platform, as the platform provides a convenient mechanism to market these services to a target audience of customers. Likewise, the ability to perform one-stop shopping for a complete array of cyber-security threat protection services that may be delivered to customers through a common interface provides incentive for customers to use the marketplace to shop for cyber security services and systems. Thus, growth of one side of the marketplace encourages growth on the other side of the marketplace, potentially leading to a continuous growth cycle. Moreover, the platform provider may ultimately be able to charge service providers, vendors, consultants and others for access to the marketplace, as access to a large base of potential customers may be very valuable to these entities. Moreover, the platform provider is also in a position to limit the cyber-security services that other service providers may provide through the platform to reduce competition with cyber-security services that the platform provider may itself offer through the platform.

In some embodiments, the platform operator or another entity may perform a comprehensive assessment of an entity's overall cyber-security posture to identify areas where the entity's existing cyber-security measurements are sufficient and areas where the existing cyber-security measures are deficient, incomplete or even non-existent. Existing cyber-security defenses can then be bolstered, as necessary, through systems and/or services provided through the integrated threat protection platform, and incomplete or missing security measures can be rectified in the same manner. The initial security assessment may include assessment of network architecture and security defenses, penetration vulnerabilities, security solution testing, security compliance and governing posture, business continuity and disaster recovery planning, and security training and awareness programs.

Various example embodiments have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

All embodiments can be combined in any way and/or combination.

As will be appreciated by one of skill in the art, the example embodiments discussed above may be embodied as a method, data processing system, and/or computer program product. Accordingly, some embodiments may be implemented entirely in hardware, others may be implemented entirely in software, and still others may be implemented in a combination of software and hardware. Some embodiments may take the form of a computer program product on a computer-usable storage medium having computer-usable program code embodied in the medium. Any suitable computer readable medium may be utilized including, for example, hard disks, CD-ROMs, optical storage devices, or magnetic storage devices.

Computer program code for carrying out operations of the above-described methods may be written in an object oriented programming language such as Java®, Smalltalk or C++. However, the computer program code for carrying out these operations may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Some embodiments are described above with reference to flowchart illustrations and/or block diagrams. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of providing cyber-security services to a plurality of customers, the method comprising:
   providing a platform that includes a software program that is configured to run on a processor to implement a user interface that is accessible by the plurality of customers, wherein the software program includes an application programming interface that is configured to allow a platform operator and a plurality of third party providers to offer computer implemented cyber-security services to the plurality of customers via the user interface;
   providing integration standards associated with the application programming interface to the plurality of third party providers, the integration standards specifying how the computer implemented cyber-security services can be integrated into the platform;
   accepting a first computer implemented cyber-security service that is provided by a first provider of the plurality of third party providers into the platform, wherein the first computer implemented cyber-security service is self-certified by the first provider as being operable through the platform;

accepting a second computer implemented cyber-security service that is provided by a second provider of the plurality of third party providers into the platform, wherein the second computer implemented cyber-security service is self-certified by the second provider as being operable through the platform;

delivering the first computer implemented cyber-security service to a first customer of the plurality of customers through the platform; and delivering the second computer implemented cyber-security service to a second customer of the plurality of customers through the platform.

2. The method of claim 1, wherein the software program is stored in a memory and the processor comprises a server, and wherein the application programming interface is configured to allow third party software programs that are controlled by the third party providers to interact with the software program to offer computer implemented cyber-security services of the third party providers to the plurality of customers through the user interface.

3. The method of claim 1, further comprising accepting a third computer implemented cyber-security service that is provided by a third provider of the plurality of third party providers into the platform, wherein the third computer implemented cyber-security service is self-certified by the third provider as being operable through the platform, and wherein the third computer implemented cyber-security service includes a module that is self-certified by a fourth provider of the plurality of third party providers as being operable through the platform.

4. The method of claim 1, further comprising accepting at least one non-cyber-security computer implemented service that is provided by a third provider of the plurality of third party providers into the platform, wherein the at least one non-cyber-security computer implemented service is self-certified by the third provider as being operable through the platform.

5. The method of claim 1, further comprising:
receiving an order for the first computer implemented cyber-security service from the first customer at the platform and passing the order to the first provider of the plurality of third party providers; and receiving data generated by the first computer implemented cyber-security service at the platform and transmitting the data to the first customer of the plurality of customers.

6. The method of claim 5, further comprising receiving commissioning information for the first computer implemented cyber-security service from the first customer at the platform and transmitting the commissioning information to the first provider prior to delivering the first computer implemented cyber-security service to the first customer.

7. The method of claim 1, wherein the user interface includes:
a web-based marketplace that identifies the computer implemented cyber-security services that are available through the platform; and at least one web-based customer interface that is configured to allow one of the plurality of customers to administer one of the cyber-security services through the platform.

8. The method of claim 1, further comprising delivering a third computer implemented cyber-security service that is provided by the platform operator to the first customer of the plurality of customers through the platform.

9. The method of claim 1, further comprising collecting information regarding identified threats at the platform, the information regarding identified threats being received from the platform operator and at least one of the plurality of third party providers.

10. The method of claim 9, wherein the information regarding identified threats is stored at the platform in a pre-determined format that is specified by the integration standards for the application programming interface.

11. The method of claim 1, further comprising:
electronically receiving log data at the platform from the first customer of the plurality of customers; and forwarding the log data to at least the platform operator and one of the third party providers.

12. The method of claim 1, further comprising delivering a non-cyber-security related service to the first customer of the plurality of customers through the platform.

13. The method of claim 1, further comprising charging the third party providers for access to the platform.

14. The method of claim 1, wherein one of the third party providers comprises a cyber-security hardware vendor, the method further comprising:
receiving at the platform an order from one of the plurality of customers for an item of hardware offered by the cyber-security hardware vendor through the platform; and receiving at the platform pre-commissioning information for the item of hardware from the one of the plurality of customers.

15. The method of claim 2, wherein the software programs that are controlled by the third party providers are stored in the memory and run on the server.

* * * * *